United States Patent [19]

Bhattacharjee et al.

[11] Patent Number: 5,600,019

[45] Date of Patent: Feb. 4, 1997

[54] POLYISOCYANATE BASED POLYMERS PERPARED FROM FORMULATIONS INCLUDING NON-SILICONE SURFACTANTS AND METHOD FOR THE PREPARATION THEREOF

[75] Inventors: Debkumar Bhattacharjee, Lake Jackson; Jerram B. Nichols, Alvin, both of Tex.; Warren A. Kaplan, Grayslake, Ill.; Vaughn M. Nace, Lake Jackson, Tex.

[73] Assignee: The Dow Chemical Company, Midland, Mich.

[21] Appl. No.: 342,299

[22] Filed: Nov. 23, 1994

Related U.S. Application Data

[63] Continuation-in-part of Ser. No. 169,477, Dec. 17, 1993, abandoned.

[51] Int. Cl.$^6$ .................. C09K 3/00; C07C 43/11
[52] U.S. Cl. ............. 568/613; 252/182.23; 252/182.24; 252/182.26; 252/182.27; 252/351; 521/114; 521/115; 521/116; 521/117; 521/118; 521/128; 521/155; 521/174; 528/76; 528/85
[58] Field of Search .............. 252/182.23, 182.24, 252/182.26, 182.27, 351; 521/155, 115, 116, 114, 117, 118, 128, 174; 528/76, 85; 568/613, 619

[56] References Cited

U.S. PATENT DOCUMENTS

| | | |
|---|---|---|
| 2,846,408 | 8/1953 | Brochhagen et al. . |
| 4,097,406 | 6/1978 | Scott et al. . |
| 4,172,186 | 10/1979 | Scott et al. . |
| 4,374,209 | 2/1983 | Rowlands . |
| 4,803,010 | 2/1989 | Ogino et al. ................ 252/173 |
| 4,837,244 | 6/1989 | Burkhart et al. . |
| 5,001,165 | 3/1991 | Canaday et al. . |
| 5,064,872 | 11/1991 | Monstrey et al. . |

FOREIGN PATENT DOCUMENTS

| | | |
|---|---|---|
| 0386814 | 12/1990 | European Pat. Off. . |
| 89/08671 | 9/1989 | WIPO . |

OTHER PUBLICATIONS

Saunders and Frisch, *Polyurethanes, Chemistry and Technology* 1 in 1 *High Polymers*, vol. XVI, pp. 32–42, 44–54, 94–97 Dec. 1962.
Saunders, K.J., *Organic Polymer Chemistry* Chapman and Hall, London, pp. 323–325 Dec. 1973.
CA–111:140,184 Jul. 1987.
CA–103:220,604 Jun. 1985.

*Primary Examiner*—James j. Seidleck
*Assistant Examiner*—John M. Cooney, Jr.

[57] ABSTRACT

Polyurethane, polyisocyanurate and polyurea polymers, particularly foamed polymers can be prepared from formulations including non-silicone polyether surfactants. The non-silicone polyether surfactants can be polyethers having from about 10 to about 90 weight percent oxyethylene units and from about 10 to about 90 weight percent oxyalkylene units having at least 4 carbons. The non-silicone polyether surfactants can be used to prepare foams having properties substantially similar to foams prepared with conventional silicone based surfactants.

13 Claims, No Drawings

5,600,019

POLYISOCYANATE BASED POLYMERS PERPARED FROM FORMULATIONS INCLUDING NON-SILICONE SURFACTANTS AND METHOD FOR THE PREPARATION THEREOF

CROSS-REFERENCE TO RELATED APPLICATION

This application is a continuation in part of U.S. Ser. No. 08/169, 477, filed December 17, 1993, titled "POLYISOCYANATE BASED POLYMERS PREPARED FROM FORMULATIONS INCLUDING NON-SILICONE SURFACTANTS AND METHOD FOR THE PREPARATION THEREOF", which is now abandoned.

BACKGROUND OF THE INVENTION

The present invention relates to polyisocyanate based polymers prepared from formulations including non-silicone surfactants. The present invention particularly relates to polyurethane, polyisocyanurate and polyurea foams prepared from formulations including non-silicone surfactants.

Polyisocyanate based polymers are known to be useful. Methylene diphenyldiisocyanate (MDI) and toluene diisocyanate (TDI) are useful monomeric polyisocyanates. Polymeric isocyanates, particularly polymeric methylene diphenyl diisocyanate (sometimes also referred to as polymethylene polyphenyl polyisocyanate, hereinafter PMDI) are very useful polymeric intermediate materials. They are used primarily as components in thermoset and thermoplastic polymer elastomers, and rigid and flexible polyurethane, polyurea and polyisocyanurate foams. Polyisocyanate based elastomers are used in applications such as reaction injection molded automobile body parts, injection molded skateboard wheels, and extruded disposable diaper components.

Polymeric isocyanates are particularly valued for the excellent insulating properties of foams prepared therewith. These insulating foams may be found in applications ranging from home construction to ice chests and refrigerators and even to industrial applications such as pipe and vessel insulation. Such foams are typically rigid.

Flexible polyurethane foams are used in a wide variety of applications, such as bedding, furniture cushioning, automobile seating, headrests, dashboards, packaging, toys and the like. These foams are generally prepared by reacting a nominally di- or trifunctional, high equivalent weight polyol with a polyisocyanate, in the presence of a blowing agent and sometimes also in the presence of a minor amount of a crosslinker.

These foams are commonly separated into two types, according to their method of manufacture. Molded foams are prepared by reacting the polyurethane-forming components in a closed mold to produce foams having a predetermined shape. In contrast, slab-stock foams are prepared by permitting the foam components to freely rise against their own weight.

It is known in the art of preparing polymer foams wherein one of the reactants is a polyisocyanate to use surfactants to compatibilize the reaction mixture and to stabilize forming foams. Often these surfactants are silicone based. For example, U.S. Pat. No. 5,064,872 to Monstrey, et al., discloses preparing polyisocyanurate foams from formulations including a polyalkylsiloxane polyether copolymer foam stabilizer. U.S. Pat. Nos. 4,097,406 and 4,172,186 to Scott, et al., discloses preparing polyurethane foams from formulations including the reaction product of reacting a silicon tetrahalide with water and an alcohol followed by transesterification with a polyether polyol.

While using silicone surfactants as stabilizers in polymer formulations is very common, it is not necessarily always the best solution in every application. One disadvantage of silicone surfactants is their cost. Silicone surfactant materials are often one of the most expensive components in a polymer formulation. Therefore, it would be desirable in the art of preparing polymers from formulations including polyisocyanates to include a non-silicone surfactant in the formulation which is significantly lower in cost than silicone surfactants imparting about the same properties to the foams produced therewith.

SUMMARY OF THE INVENTION

In one aspect, the present invention is an active hydrogen containing composition comprising (A) a polyfunctional active hydrogen containing compound, (B) an optional blowing agent, (C) an optional catalyst and (D) a non-silicone surfactant wherein the surfactant is a polyether having from about 10 to about 90 weight percent oxyethylene units and from about 10 to about 90 weight percent oxyalkylene units having at least 4 carbons and is substantially free of oxypropylene units.

In another aspect, the present invention is a polymer prepared from a formulation including: (1) a polyisocyanate, (2) a polyfunctional active hydrogen containing compound, (3) an optional blowing agent, (4) an optional catalyst and (5) a non-silicone surfactant wherein the surfactant is a polyether having from about 10 to about 90 weight percent oxyethylene units and from about 10 to about 90 weight percent oxyalkylene units having at least 4 carbons and is substantially free of oxypropylene units.

Another aspect of the present invention is a method of preparing a polymer comprising admixing a polymer formulation including (1) a polyisocyanate, (2) a polyfunctional active hydrogen containing compound, (3) an optional blowing agent, (4) an optional catalyst and (5) a non-silicone surfactant wherein the surfactant is a polyether having from about 10 to about 90 weight percent oxyethylene units and from about 10 to about 90 weight percent oxyalkylene units having at least 4 carbons and is substantially free of oxypropylene units.

In still another aspect, the present invention is, in a method of preparing a polymer foam from a formulation including (1) a polyisocyanate, (2) a polyfunctional active hydrogen containing compound, (3) a blowing agent, (4) an optional catalyst and (5) a surfactant, the improvement comprising using a formulation including a non-silicone surfactant wherein the surfactant is a polyether having from about 10 to about 90 weight percent oxyethylene units and from about 10 to about 90 weight percent oxyalkylene units having at least 4 carbons and is substantially free of oxypropylene units.

The present invention is also a composition prepared by a process comprising capping a polyether which has from about 10 to about 90 weight percent oxyethylene units and from about 10 to about 90 weight percent oxyalkylene units having at least 4 carbons and is substantially free of oxypropylene units with an amine or hydroxy reactive material.

Yet another aspect of the present invention is a composition of 15 matter having the general formula:

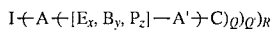

wherein I is the non-alkoxy-reactive portion of an initiator; A and A' are independently O, N, or NH; E is an oxyethylene group; B is an oxybutylene group; P is an oxypropylene group; x, y are values such that the ratio of x:y is from 1:4 to 4:1; z is a value such that the total weight of oxypropylene units is less than 10 percent of the combined weight of oxyethylene units and oxybutylene units; R is from 1 to 8 depending upon the functionality of the initiator; Q and Q' are independently 1 if A or A' is O or NH and Q and Q' are 2 if A or A' is N; the total molecular weight of the compound is from 750 to 11,000; C is the remainder of a capping compound; and E and B are substantially in blocks.

DESCRIPTION OF THE PREFERRED EMBODIMENTS

In one embodiment, the present invention is a polymer prepared from a formulation including: (1) a polyisocyanate, (2) a polyfunctional active hydrogen containing compound, (3) an optional blowing agent, (4) an optional catalyst and (5) a non-silicone surfactant. Polymers which can be prepared from formulations of the present invention include but are not limited to polyurethanes, polyisocyanurates, polyurethane modified polyisocyanurates, polyureas and the like. The polymers can be elastomers, rigid foams or flexible foams. All of these materials can be formed by the reaction of a polyisocyanate and an active hydrogen containing material, optionally in the presence of a blowing agent.

Surfactants often can be critical components in polymer formulations. The non-silicon surfactants of the present invention can perform at least two important functions. The surfactant can act to compatibilize the polyisocyanate with the other formulation components. This is particularly important in foam formulations where fine foam cell size is needed, such as, for example, in appliance foam wherein the foam can perform an insulative function. The surfactant acts to allow the polyisocyanate and the other formulation components to be thoroughly admixed, with the blowing agent particularly being distributed throughout the reaction admixture such that very small bubbles make up the froth which eventually forms the foam.

The surfactants can also function to stabilize a foam. This is particularly important in rigid foam applications. As a froth is formed in the reaction mixture, it is subject to destabilization until sufficient polymer molecular weight builds to support it. In unstabilized formulations, the bubbles of the froth can break and release the gasses which act to impart insulative properties to foam. Likewise, the weight of a rising, forming froth can build too quickly for in unstabilized foam formulations causing the foam to collapse under its own weight. In stabilizing the foam, the non-silicone surfactants of the present invention can act to prevent the bubbles of the froth from breaking. The surfactants can also impart some dimensional stability to the froth until the forming polymer has built sufficient molecular weight to support itself.

The surfactants of the present invention are non-silicone based. The surfactants of the present invention are polyethers having from about 10 to about 90 weight percent oxyethylene units and from about 10 to about 90 weight percent oxyalkylene units having at least 4 carbons. Such weight percent calculation is made disregarding the weight of the initiator. Preferably the weight ratio of oxyethylene units to other oxyalkylene units in the surfactant is from about 1:4 to about 4:1. More preferably the weight ratio of oxyethylene units to other oxyalkylene units in the surfactant is from about 1:3 to about 3:1. Even more preferably the weight ratio of oxyethylene units to other oxyalkylene units in the surfactant is from about 1:2 to about 2:1. Most preferably the weight ratio of oxyethylene units to other oxyalkylene units in the surfactant is about 1.5:2.0 to 2.0:1.5.

The polyether surfactants of the present invention are substantially free of oxypropylene units. The inclusion of oxypropylene units into the backbone of the polyether surfactants of the present invention can substantially decrease the surfactant characteristics thereof. Preferably, the polyether surfactants of the present invention include less than 10 weight percent oxypropylene units, more preferably less than 5 weight percent oxypropylene units, even more preferably less than 1 weight percent oxypropylene units, and most preferably no oxypropylene units.

The non-silicone polyether surfactants of the present invention have a molecular weight of from about 750 to about 11,000. Preferably they have a molecular weight of from about 1,000 to about 8,000 and more preferably they have a molecular weight of from about 2,000 to about 7,000. The non-silicone surfactants have a nominal functionality of from about 1 to about 8, preferably from about 2 to about 4, and most preferably from about 2 to about 3.

The non-silicone surfactants of the present invention are prepared with ethylene oxide and at least one other alkylene oxide having at least 4 carbons. Preferably the other alkylene oxide has from 4 to about 8 carbons, more preferably it has from 4 to about 6 carbons. Most preferably, the other alkylene oxide used to prepare the non-silicone surfactants of the present invention is butylene oxide.

There are several ways to prepare the non-silicone surfactants of the present invention. In one embodiment, the surfactants of the present invention are prepared by forming a polybutylene oxide polyether by combining a propylene glycol initiator and butylene oxide in the presence of a basic catalyst. A block polymer is then prepared by combining the polybutylene oxide with ethylene oxide in the presence of a basic catalyst to form an ethylene oxide/butylene oxide block polyether. In another embodiment, the surfactants of the present invention can be prepared by first forming a polyethylene oxide polyether and then forming a block polymer by combining the polyethylene oxide with butylene oxide in the presence of a basic catalyst. Block polymers are useful for forming polyethers having comparatively lower molecular weights, but it can be desirable to introduce some level of randomness for forming polyethers having molecular weights of greater than about 2,000. For example, in another embodiment, a surfactant of the present invention can be prepared by first forming a polybutylene oxide as described above, and then combining the polybutylene oxide with a mixed feed of ethylene oxide and butylene oxide in the presence of a basic catalyst.

The non-silicone surfactants of the present invention can have a nominal functionality of from about 1 to about 8. While the surfactants of the present invention can be prepared in any way known to be useful for preparing polyethers, they are typically prepared by combining an initiator with an alkylene oxide in the presence of a basic catalyst. Selection of the initiator is important in determining the nominal functionality of the resulting surfactant. For example, methanol can be used as an initiator to prepare a surfactant having a nominal functionality of 1. Sucrose can be used to prepare a surfactant having a nominal functionality as high as 8. Mixtures of initiators can also be used.

Special properties can be imparted to the non-silicone surfactants of the present invention by careful selection of initiators. For example, ethylene diamine can be used as an initiator. Other initiators including catalytic groups can also be used to prepare surfactants having catalytic properties. Initiators useful with the present invention include those generally used to prepare polyether polyols such as alkanolamines, alcohols, amines and the like. Such initiators include but are not limited to: 2-aminoethanol, ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, ethylene diamine, glycerin, ammonia, 1,2,3,4-tetrahydroxy butane, fructose, sucrose and the like.

The surfactants of the present invention can be at least monoor higher hydroxy or amine functional. As such they can be incorporated into prepolymers or capped with amine or hydroxy reactive materials. For example, the surfactants of the present invention can be incorporated into a isocyanate terminated prepolymer by reacting the surfactant with a stoichiometric excess of a polyisocyanate. Similarly, they can be capped with, for example, low molecular weight halo-alkanes, organic acid halides, and the like. Preferably, the capping material will not include a polyisocyanate reactive group. Capping with compounds which result in a surfactant non-reactive to polyisocyanates permits the surfactant to be admixed with polyisocyanates without reaction where such mixing is desirable. Capping is achieved by admixing a non-silicon surfactant with a capping compound under reaction conditions sufficient to react the capping compound with the amine or hydroxy group of the non-silicone polyether surfactant.

Capped polyether surfactants of the present invention have the following general formula:

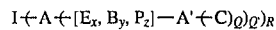

wherein I is the non-alkoxy-reactive portion of an initiator; A and A' are independently O, N, or NH; E is an oxyethylene group; B is an oxybutylene group; p is an oxypropylene group; x, y are values such that the ratio of x:y is from 1:4 to 4:1; z is a value such that the total weight of oxypropylene units is less than 10 percent of the combined weight of oxyethylene units and oxybutylene units; R is from 1 to 8 depending upon the functionality of the initiator; Q and Q' are independently 1 if A or A' is O or NH and Q and Q' are 2 if A or A' is N; the total molecular weight of the compound is from 750 to 11,000; C is the remainder of a capping compound; and E and B are substantially in blocks. For example, where the polyether is prepared with a propylene glycol initiator, a 1:1 ratio of oxyethylene and oxybutylene, and is capped with acetic anhydride: A and A' are O; x and y are at a ratio of 1:1; z is 0; Q and Q' are 1; R is 2; I has the formula:

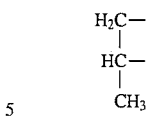

and C has the formula:

One embodiment of the present invention is a polymer resulting from the reaction of a polyisocyanate and a polyfunctional active hydrogen containing material. The polyisocyanate component can be advantageously selected from organic polyisocyanates, modified polyisocyanates, isocyanate-based prepolymers, and mixtures thereof. These can include aliphatic and cycloaliphatic isocyanates, but aromatic and especially multifunctional aromatic isocyanates are preferred. Preferred are 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates. Also useful for preparing the present invention are aliphatic and cycloaliphatic isocyanate compounds such as 1,6-hexamethylenediisocyanate; 1-isocyanato-3,5,5-trimethyl-1-3-isocyanatomethyl-cyclohexane; 2,4- and 2,6-hexahydrotoluenediisocyanate, as well as the corresponding isomeric mixtures; 4,4'-, 2,2- and 2,4'-dicyclohexylmethanediisocyanate, as well as the corresponding isomeric mixtures.

Also advantageously used for the polyisocyanate component are the so-called modified multifunctional isocyanates, i.e., products which are obtained through chemical reactions of the above diisocyanates and/or polyisocyanates. Exemplary are polyisocyanates containing esters, ureas, biurets, allophanates and preferably carbodiimides and/or uretonimines; isocyanurate and/or urethane group containing diisocyanates or potyisocyanates. Liquid polyisocyanates containing carbodiimide groups, uretonimine groups and/or isocyanurate rings, having isocyanate groups (NCO) contents of from 10 to 40 weight percent, more preferably from 10 to 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures, 4,4'-, 2,4'- and 2,2'-diphenylmethanediisocyanate and the corresponding isomeric mixtures; mixtures of diphenylmethane diisocyanates and PMDI and mixtures of toluenediisocyanates and PMDI and/or diphenylmethane diisocyanates.

Suitable also are prepolymers having NCO contents of from 5 to 40 weight percent, more preferably from 15 to 30 weight percent. These prepolymers are prepared by reaction of polyisocyanates with materials including lower molecular weight diols, triols, but also they can be prepared with multivalent active hydrogen compounds such as di- and tri-amines and di- and tri-thiols. Individual examples are aromatic polyisocyanates containing urethane groups, preferably having NCO contents of from about 5 to about 40 weight percent, more preferably about 20 to 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di-and/or polyoxyalkylene glycols. For example, diethylene glycols, dipropylene glycols, polyoxyethylene glycols, polyoxypropylene glycols and polyoxypropylenepolyoxyethylene glycols can be used.

Particularly useful in the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from 20 to 35 weight percent, based on the weight of the prepolymer, prepared by the reaction of polyoxyalkylene polyols, having a functionality of preferably from 2 to 4 and a molecular weight of from about 800 to about 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluene-diisocyanate and the corresponding isomeric mixtures. PMDI in any of its forms can also be used and is preferred. In this case it preferably has an equivalent weight between about 125 and about 300, more preferably from about 130 to about 175, and an average functionality of greater than about 2. More preferred is an average functionality of from about 2.0 to about 3.5. The viscosity of the polyisocyanate component is preferably from about 25 to about 5,000 centipoise (cps) (0.025 to about 5 Pa.s), but values from about 100 to about 1,000 cps at 25° C. (0.1 to 1 Pa.s) are preferred for ease of processing. Similar viscosities are preferred where alternative polyisocyanate components are selected.

In preparing the polymers of the present invention, an "A" component (which includes the polyisocyanate) is mixed with a "B" component which is an active hydrogen containing compound. The active hydrogen containing compounds of the "B" component can be either the same as those used to prepare the prepolymer of the "A" component, if the A component is a prepolymer, or they can be different. Active hydrogen containing compounds most commonly used are those compounds having at least two hydroxyl groups. Those compounds are referred to herein as polyols. Representatives of suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6,198–199 (1964); *Organic Polymer Chemistry* by K. J. Saunders, Chapman and Hall, London, pp. 323–325 (1973); and *Developments in Polyurethanes*, Vol. I, J. M. Burst, ed., Applied Science Publishers, pp. 1–76 (1978). However, any active hydrogen containing compound can be used with the method of this invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerine, ammonia, 1,2,3,4-tetrahydroxy butane, fructose, and sucrose.

Also preferred are poly(oxypropylene) glycols, triols, tetrols and hexols and any of these that are capped with ethylene oxide. These polyols also include poly(oxypropyleneoxyethylene)polyols. The oxyethylene content should preferably comprise less than about 80 weight percent of the total and more preferably less than about 40 weight percent. The ethylene oxide, when used, can be incorporated in any way along the polymer chain, for example, as internal blocks, terminal blocks, or randomly distributed blocks, or any combination thereof.

Polyamines, aromatic polyester polyols, aliphatic polyester polyols, amine-terminated polyols, polymercaptans and other isocyanate-reactive compounds are also suitable in the present invention. Polyisocyanate polyaddition active hydrogen containing compounds (PIPA) are particularly preferred for use with the present invention. PIPA compounds are typically the reaction products of TDI and triethanolamine. A method for preparing PIPA compounds can be found in, for example, U.S. Pat. No. 4,374,209, issued to Rowlands.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

The polymer foams of the present invention are prepared using blowing agents. The polyisocyanates of the present invention are advantageously reacted with active hydrogen compounds in the presence of a blowing agent. Any blowing agent or mixture thereof is suitable for use in the practice of the present invention. Suitable blowing agents include inorganic blowing agents such as water, organic blowing agents which are volatile at reaction temperatures and dissolved inert gases. Suitable organic blowing agents include acetone; ethyl acetate; methanol; ethanol; halogen-substituted alkanes such as methylene chloride, chloroform, ethylidene chloride, trichlorofluoromethane, 1,1-dichloro-1-fluoroethane, 1,1,1,2-tetrafluoroethane, chlorodifluoromethane, dichlorodi-fluoromethane and the like; butane; pentane; hexane; heptane; diethyl ether; and the like. Gases inert to the starting components such as nitrogen, air, carbon dioxide and the like are also useful blowing agents. Compounds, such as azides, which decompose at suitable temperatures to produce gases such as nitrogen are also useful. Preferred blowing agents are compounds which boil between about −50° and 100° C., more preferably between about −40° and 50° C.

The amount of blowing agent employed is not critical to the invention, but is preferably sufficient to foam the reaction mixture. The amount will vary with factors such as the density desired in a foamed product.

Water is a useful blowing agent for use in the practice of the invention. In addition to generating carbon dioxide gas for foaming, water reacts quickly with polyisocyanate components, thus contributing to early polymer strength needed for gas retention. Generally, when water is used, it is present in proportions of from about 0.4 to about 8 weight percent of water based on total weight of active hydrogen containing compositions or B component. Other blowing agents, can be used in combination with water.

The present invention includes polymers such as polyurethanes, polyisocyanurates and polyureas. Polyurea formulations often can be self catalyzing. Polyurethane and polyisocyanurate foam formulations usually include a catalyst. Polyurethane catalysts are suitably used with the present invention. The catalyst is preferably incorporated in the formulation in an amount suitable to increase the rate of reaction between the isocyanate groups of the composition of the present invention and a hydroxyl-reacting species. Although a wide variety of materials is known to be useful for this purpose, the most widely used and preferred catalysts are the tertiary amine catalysts and the organotin catalysts.

Examples of the tertiary amine catalysts include, for example, triethylenediamine, pentamethyldiethylenetriamine, N-methyl morpholine, N-ethyl morpholine, diethylethanolamine, N,N-dimethylcyclohexylamine, dimethylethanolamine, N-coco morpholine, 1-methyl-4-dimethylaminoethyl piperazine, 3-methoxy-N-dimethylpropylamine, N,N-diethyl-3-diethyl aminopropylamine, dimethylbenzyl amine and the like. Tertiary amine catalysts are advantageously employed in an amount from about 0.01 to about 5 percent by weight of the polyol formulation.

Examples of organotin catalysts include dimethyltin dilaurate, dibutyltin dilaurate, dioctyltin dilaurate, stannous octoate and the like. Other examples of effective catalysts include those taught in, for example, U.S. Pat. No. 2,846,408. Preferably the organotin catalyst is employed in an amount from about 0.001 to about 0.5 percent by weight of the polyol formulation.

Suitable catalysts for use with the present invention include those which catalyze the formation of isocyanurates such as those mentioned in Saunders and Frisch, *Polyurethanes, Chemistry and Technology* in 1 *High Polymers* Vol. XVI, pp. 94–97 (1962). Such catalysts are referred to herein as trimerization catalysts. Examples of these catalysts include aliphatic and aromatic tertiary amine compounds, organometallic compounds, alkali metal salts of carboxylic acids, phenols and symmetrical triazine derivatives. Preferred catalysts are potassium salts of carboxylic acids such as potassium octoate and the potassium salt of 2-ethylhexanoic acid and tertiary amines such as, for instance, 2,4,6-tris(dimethyl aminomethyl) phenol.

Also suitable used with the present invention are fillers and additives. Fillers are generally inorganic materials which can be used to displace more expensive organic components and sometimes improve certain physical properties for example, chopped glass, glass fibers, kaolins, and the like can be included in the formulations of the present invention. Additives are generally materials added to a polymer formulation to impart some special property for example, conductivity inducing agents, flame retardants, pigments, and the like can all be included in the formulations of the present invention. Any filler or additive known to those skilled in the art of preparing polymer foams to be useful can be user with the present invention.

The surfactants of the present invention can be used to prepare polyurethane polymers. In two component (A and B) polyurethane polymer formulations, the uncapped non-silicone surfactants can be included in the B side wherein they are generally stable. Alternatively, the uncapped non-silicone surfactants of the present invention can be included in the A side wherein they can be used to form a prepolymer. The capped surfactants of the present invention can be included in either the A side or the B side. Where appropriate, an active hydrogen reactive group containing capping compound can be used to prepare a surfactant useful for forming a B side prepolymer. In three component polyurethane formulations, wherein the 3rd or "C" component is a catalyst, all or part of the no-silicone surfactant of the present invention can also included therein.

The surfactants of the present invention are included in polyurethane formulations at a concentration suitable to perform the desired functions of foam stabilization and reaction mixture compatibilization. Due to the wide variations in weight ratios of polyurethane formulation components, it is customary in the art of preparing polyurethanes to specify surfactant loadings as parts surfactant per 100 parts polyol in the B side of the formulation. For purposes of the present invention, the concentration of non-silicone surfactants of the present invention in polyurethane formulations shall be measured as parts surfactant per 100 parts active hydrogen including compounds in the B side, not including the surfactants. Preferably, the non-silicone surfactants of the present invention are present at a reaction mixture concentration of from about 0.25 parts to about 20 parts per 100 parts of active hydrogen including compounds, more preferably from about 0.5 parts to about 10 parts per 100 parts of active hydrogen including compounds, and even more preferably from about 1 part to about 5 parts per 100 parts of active hydrogen including compounds.

The following examples are provided to illustrate the present invention. The examples are not intended to limit the scope of the present invention and they should not be so interpreted. Amounts are in weight parts or weight percentages unless otherwise indicated.

EXAMPLE 1

A non-silicone polyether surfactant is prepared by charging 656 grams of 1,2-propylene glycol containing about 6 percent KOH into a closed system reaction vessel. The reactor is sealed and heated to 130° C. 5645 grams of 1,2-butylene oxide is fed into the reactor at rate sufficient to avoid exceeding 70 psi (482.6 kPa) and until subsequent pressure drops are less than 0.5 psi (3.4 kPa) per hour. 3767 grams of this intermediate material are removed from the reactor. Next, 597 grams of ethylene oxide are fed into the reactor. After the pressure drop is stabilized, the polyether surfactant is analyzed. The resulting polyether surfactant has a molecular weight of about 902, a weight percent oxybutylene groups (hereinafter BO) of 72.5, a weight percent oxyethylene groups (hereinafter EO) of 19.1 and a nominal functionality of 2.

A polymer foam is prepared by admixing the formulation disclosed below in Table 1 by first admixing thoroughly a polyol, catalyst, surfactant and blowing agent in a plastic cup. Next, PMDI is added to the cup and the admixture is stirred at 1,500 rpm using a 4 in. (10.2 cm) impeller attached to a drill press. The polymerizing admixture is poured into a 14 in.×14 in. 14 in. (35.6 cm×35.6 cm×35.6 cm) box mold and allowed to rise. Physical properties and the reaction profile for the polymer foam are determined and recorded below in Table 2.

EXAMPLE 2

A polymer foam is prepared and tested substantially identically to Example 1 except that a polyether surfactant having a molecular weight of 1,836, a weight percent BO of 53.2, a weight percent EO of 42.6 and a nominal functionality of 2 is used. Physical properties and the reaction profile for the polymer foam are determined and recorded below in Table 2.

EXAMPLE 3

A polymer foam is prepared and tested substantially identically to Example 1 except that a polyether surfactant initiated with triethyleneglycol monomethyl ether and having a molecular weight of 1,428, a weight percent BO of 44.6, a weight percent EO of 50.0 and a nominal functionality of 2 is used. Physical properties and the reaction profile for the polymer foam are determined and recorded below in Table 2.

COMPARATIVE EXAMPLE 4

A polymer foam is prepared and tested substantially identically to Example 1 except that a conventional silicone based surfactant is used. Physical properties and the reaction profile for the polymer foam are determined and recorded below in Table 2.

TABLE 1

| | CONCENTRATION IN WEIGHT PARTS | | | |
|---|---|---|---|---|
| EXAMPLE NUMBER | 1 | 2 | 3 | Comp. 4* |
| Polyol[1] | 100.0 | 100.0 | 100.0 | 100.0 |
| Surfactant A | 1.5 | — | — | — |
| Surfactant B | — | 1.5 | — | — |
| Surfactant C | — | — | 1.5 | — |
| Conventional Silicone Surfactant[2] | — | — | — | 1.5 |
| Urethane Catalyst[3] | 0.23 | 0.23 | 0.23 | 0.23 |
| Isocyanurate Catalyst[4] | 1.8 | 1.8 | 1.8 | 1.8 |
| Blowing Agent[5] | 40.6 | 40.6 | 40.6 | 40.6 |
| Polyisocyanate[6] | 158.9 | 158.9 | 158.9 | 158.9 |

*NOT AN EXAMPLE OF THE PRESENT INVENTION
[1]STEPANPOL PS-2502 which is an aromatic polyester polyol having a hydroxyl number of 250 (STEPANPOL PS-2502 is a trade designation of the Stepan Company).
[2]Organosiloxane-polyether copolymer surfactant.
[3]POLYCAT 8 is a N,N-dimethylcyclohexylamine catalyst and is a trade designation of Air Products and Chemicals, Inc.
[4]HEXCEM 977 is a potassium salt of 2-ethylhexanoic acid in diethylene glycol and is a trade designation of OM Group, Inc.
[5]CFC-11 is a trichlorofluoromethane blowing agent.
[6]A PMDI having a viscosity of 700 cps (0.7 NS/m$^3$) and a isocyanate equivalent weight of about 139.

TABLE 2

| EXAMPLE NUMBER | 1 | 2 | 3 | Comp. 4* |
|---|---|---|---|---|
| REACTION PROFILE[1] | | | | |
| Cream Time | 20 | 22 | 20 | 23 |
| Gel Time | 44 | 45 | 45 | 55 |
| Rise Time | 71 | 76 | 60 | 73 |
| Core Density[2] pcf/(kg/cm$^3$) | 1.49/23.9 | 1.44/23.0 | 1.56/25.0 | 1.52/24.3 |
| K-factor[3] | 0.129 | 0.124 | 0.122 | 0.128 |
| COMPRESSIVE STRENGTH[4] psi/kPa | | | | |
| Parallel to Rise | 27.6/ 190.3 | 24.3/ 167.5 | 31.0/ 213.7 | 34.4/ 237.2 |
| Perpendicular to Rise(1) | 14.2/ 97.9 | 14.0/ 96.5 | 16.8/ 115.8 | 16.4/ 113.1 |
| Perpendicular to Rise(2) | 14.8/ 102.0 | 14.1/ 97.2 | 16.5/ 113.8 | 15.0/ 103.4 |

*NOT AN EXAMPLE OF THE PRESENT INVENTION
[1]The reactivity profile can be determined by measuring the time from mixing of a polyisocyanate or an admixture of polyisocyanates with an active compound until specific phenomena are observed in a forming polyurethane or polyisocyanate foam. The measurements of foam forming ability include:

TABLE 2-continued

| EXAMPLE NUMBER | 1 | 2 | 3 | Comp. 4* |
|---|---|---|---|---| a) Cream time: the time in seconds from mixing until foaming begins, determined by observing when gas first begins to expand the admixture;
b) Gel time: the time in seconds from mixing until the foaming admixture first begins to produce "strings" adhering to a wooden spatula quickly inserted and removed from the foaming admixture;
c) Rise time: the time in seconds from mixing until the foam stops rising;
d) Tack-free time: the time in seconds from mixing until the foam surface losed its sticky quality.
[2]ASTM-D-1622-88.
[3]ASTM-C-518-85
[4]ASTM-D-1621-73

EXAMPLE 5

A polymer foam is prepared and tested substantially identically to Example 1 except that a formulation displayed below in Table 3 is used. The polyether surfactant has a molecular weight of about 902, a weight percent BO of 72.5, a weight percent EO of 19.1 and a nominal functionality of 2. Physical properties and the reaction profile for the polymer foam are determined and recorded below in Table 4.

EXAMPLE 6

A polymer foam is prepared and tested substantially identically to Example 5 except that a polyether surfactant having a molecular weight of 1,836, a weight percent BO of 53.2, a weight percent EO of 42.6 and a nominal functionality of 2 is used. Physical properties and the reaction profile for the polymer foam are determined and recorded below in Table 4.

EXAMPLE 7

A polymer foam is prepared and tested substantially identically to Example 5 except that a polyether surfactant initiated with triethyleneglycol monomethyl ether and having a molecular weight of 1,428, a weight percent BO of 44.6, a weight percent EO of 50.0 and a nominal functionality of 2 is used. Physical properties and the reaction profile for the polymer foam are determined and recorded below in Table 4.

COMPARATIVE EXAMPLE 8

A polymer foam is prepared and tested substantially identically to Example 5 except that a conventional silicone based surfactant is used. Physical properties and the reaction profile for the polymer foam are determined and recorded below in Table 4.

TABLE 3

| | CONCENTRATION IN WEIGHT PARTS | | | |
|---|---|---|---|---|
| EXAMPLE NUMBER | 5 | 6 | 7 | Comp. 8* |
| Polyol[1] | 100.0 | 100.0 | 100.0 | 100.0 |
| Surfactant A | 2.1 | — | — | — |
| Surfactant B | — | 2.1 | — | — |
| Surfactant C | — | — | 2.1 | — |
| Conventional Silicone Surfactant[2] | — | — | — | 2.1 |
| Urethane Catalyst[3] | 0.20 | 0.20 | 0.20 | 0.20 |
| Urethane Catalyst[4] | 0.10 | 0.10 | 0.10 | 0.10 |
| Isocyanurate Catalyst[5] | 5.0 | 5.0 | 5.0 | 5.0 |
| Water | 2.5 | 2.5 | 2.5 | 2.5 |
| Blowing Agent[6] | 26.9 | 26.9 | 26.9 | 26.9 |

TABLE 3-continued

CONCENTRATION IN WEIGHT PARTS

| EXAMPLE NUMBER | 5 | 6 | 7 | Comp. 8* |
|---|---|---|---|---|
| Polyisocyanate[7] | 265.1 | 265.1 | 265.1 | 265.1 |

NOT AN EXAMPLE OF THE PRESENT INVENTION
[1]STEPANPOL PS-2502 which is an aromatic polyester polyol having a hydroxyl number of 250 (STEPANPOL PS-2502 is a trade designation of the Stepan Company).
[2]Organosiloxane-polyether copolymer surfactant.
[3]POLYCAT 8 is a N,N-dimethylcyclohexylamine catalyst and is a trade designation of Air Products and Chemicals, Inc.
[4]POLYCAT 5 is a pentamethyldiethylenetriamine catalyst and is a trade designation of Air Products and Chemical, Inc.
[5]HEXCEM 977 is a potassium salt of 2-ethylhexanoic acid in diethylene glycol and is a trade designation of OM Group, Inc.
[6]CFC-11 is a trichlorofluoromethane blowing agent.
[7]A PMDI having a viscosity of 700 cps (0.7 NS/m$^3$) and a isocyanate equivalent weight of about 139.

TABLE 4

| EXAMPLE NUMBER | 5 | 6 | 7 | Comp. 8* |
|---|---|---|---|---|
| REACTION PROFILE[1] | | | | |
| Cream Time | 21 | 21 | 21 | 21 |
| Gel Time | 72 | 64 | 58 | 60 |
| Rise Time | 94 | 92 | 95 | 90 |
| Core Density[2] pcf/(kg/m$^3$) | 1.72/27.6 | 1.66/26.6 | 1.69/27.1 | 1.72/27.6 |
| K-factor[3] | 0.149 | 0.158 | 0.157 | 0.155 |
| COMPRESSIVE STRENGTH[4] psi/kPa | | | | |
| Parallel to Rise | 25.9/ 178.6 | 25.1/ 173.1 | 26.1/ 180/0 | 37.7/ 259.9 |
| Perpendicular to Rise(1) | 16.8/ 115.8 | 16.9/ 116.5 | 17.1/ 117.9 | 17.3/ 119.3 |
| Perpendicular to Rise(2) | 15.8/ 108.9 | 15.9/ 109.6 | 16.1/ 111.0 | 16.2/ 111.7 |

NOT AN EXAMPLE OF THE PRESENT INVENTION
[1]See note 1 in Table 2.
[2]ASTM-D-1622-88
[3]ASTM-C-518-85
[4]ASTM-D-1621-73

EXAMPLE 9

A polymer foam is prepared and tested substantially identically to Example 1 except that a formulation displayed below in Table 5 is used. The polyether surfactant is initiated with a EO adduct of methanol (having a formula: MeOCH$_2$CH$_2$OCH$_2$CH$_2$OCH$_2$CH$_2$OH) and has a molecular weight of about 1550, a weight percent BO of 33.4, a weight percent EO of 56.1 and a nominal functionality of 1. Physical properties and the reaction profile for the polymer foam are determined and recorded below in Table 6.

COMPARATIVE EXAMPLE 10

A polymer foam is prepared and tested substantially identically to Example 9 except that a conventional silicone based surfactant only is used. Physical properties and the reaction profile for the polymer foam are determined and recorded below in Table 6.

TABLE 5

CONCENTRATION IN WEIGHT PARTS

| EXAMPLE NUMBER | 9 | Comp. 10* |
|---|---|---|
| Polyol[1] | 100.0 | 100.0 |
| Surfactant D | 1.0 | — |
| Conventional Silicone Surfactant[2] | 1.0 | 2.0 |
| Urethane Catalyst[3] | 0.60 | 0.60 |
| Isocyanurate Catalyst[4] | 2.3 | 2.3 |
| Water | 1.0 | 1.0 |
| Blowing Agent[5] | 32 | 32 |
| Polyisocyanate[6] | 187.5 | 187.5 |

NOT AN EXAMPLE OF THE PRESENT INVENTION
[1]STEPANPOL PS-2502 which is an aromatic polyester polyol having a hydroxyl number of 250 (STEPANPOL PS-2502 is a trade designation of the Stepan Company).
[2]Organosiloxane-polyether copolymer surfactant.
[3]POLYCAT 8 is a N,N-dimethylcyclohexylamine catalyst and is a trade designation of Air Products and Chemicals, Inc.
[4]HEXCEM 977 is a potassium salt of 2-ethylhexanoic acid in diethylene glycol and is a trade designation of OM Group, Inc.
[5]HCFC-141b is a 1,1-dichloro-1-fluoroethane blowing agent.
[6]A PMDI having a viscosity of 700 cps (0.7 NS/m$^3$) and a isocyanate equivalent weight of about 139.

TABLE 6

| EXAMPLE NUMBER | 9 | Comp. 10* |
|---|---|---|
| REACTION PROFILE[1] | | |
| Cream Time | 16 | 16 |
| Gel Time | 31 | 32 |
| Rise Time | 60 | 60 |
| Core Density[2] pcf/(kg/m$^3$) | 1.74/27.9 | 1.77/28.4 |
| K-factor[3] | 0.148 | 0.149 |
| COMPRESSIVE STRENGTH[4] psi/kPa | | |
| Parallel to Rise | 30.7/211.7 | 33.0/227.5 |
| Perpendicular to Rise(1) | 14.8/102.2 | 13.9/96.0 |
| Perpendicular to Rise(2) | 14.8/102.0 | 13.8/95.1 |
| BURN TEST[5] | | |
| Smoke Release | 665 | 765 |
| Heat Release | 190 | 186 |
| Percent Weight Loss | 33.7 | 38.3 |

*NOT AN EXAMPLE OF THE PRESENT INVENTION
[1]See note in Table 2.
[2]ASTM-D-1822-88
[3]ASTM-c-518-85
[4]ASTM-D-1621-73
[5]ASTM-E-906-83.

EXAMPLE 11

A polymer foam is prepared substantially identically to Example 1 except that a formulation displayed below in Table 7 is used. The polyether surfactant is initiated with propylene glycol and has a molecular weight of about 6,800, a weight percent BO of 60.6, a weight percent EO of 38.3 and a nominal functionality of 2. The foam is visually inspected for foam quality. If the foam has fine cell size and is not excessively friable, it passes the foam quality test which is indicated by a "+" in Table 7 below.

EXAMPLE 12

A polymer foam is prepared and tested substantially identically to Example 11 except that the surfactant has a molecular weight of about 4,595, a weight percent BO of 78.9, a weight percent EO of 19.6 and a nominal functionality of 2. Foam results are displayed below in Table 7 below.

COMPARATIVE EXAMPLE 13

A polymer foam is prepared and tested substantially identically to Example 11 except that the surfactant is a conventional silicone surfactant. Foam results are displayed below in Table 7 below.

TABLE 7

| | CONCENTRATION IN WEIGHT PARTS | | |
|---|---|---|---|
| EXAMPLE NUMBER | 11 | 12 | Comp. 13* |
| Polyol[1] | 100 | 100 | 100 |
| Surfactant B | 1.0 | — | — |
| Surfactant F | — | 1.5 | — |
| Conventional Silicone Surfactant[2] | — | — | 2.0 |
| Urethane Catalyst[3] | 2.85 | 2.85 | 2.85 |
| Isocyanurate Catalyst[4] | 2.5 | 2.5 | 2.5 |
| Water | 3.7 | 3.7 | 3.7 |
| Blowing Agent[5] | 21 | 21 | 21 |
| Polyisocyanate[6] | 176.0 | 176.0 | 176.0 |
| Foam Quality[7] | + | + | + |
| Core Density[8] pcf/(kg/m$^3$) | 1.32/21.2 | 1.32/21.2 | 1.32/21.2 |

*NOT AN EXAMPLE OF THE PRESENT INVENTION
[1]A polyether polyol having a functionality of about 3.9 and a OH equivalent weight of 145.2.
[2]Organosiloxane-polyether copolymer surfactant.
[3]A mixture of tertiary amines.
[4]CURITHANE 52 is a sodium glycinate derivative and is a trade designation of The Dow Chemical company.
[5]HCFC-141b is a 1,1-dichloro-1-fluoroethane blowing agent.
[6]A polyisocyanate have an isocyanate equivalent weight of about 134, a viscosity at 25° C. of about 170 and a functionality of about 2.7
[7]See note in Example 11 text above.
[8]ASTM-D-1622-88

COMPARATIVE EXAMPLE 14

A polymer foam is prepared substantially identically to Example 11 except no surfactant is used. The foam is tested for foam quality and fails.

COMPARATIVE EXAMPLE 15

A polymer foam is prepared substantially identically to Example 11 except that an ethylene oxide/propylene oxide polyether surfactant is used. The surfactant has a molecular weight of about 6,600, a weight percent propylene oxide of 44.4, a weight percent EO of 52 and a nominal functionality of 2. The foam is tested for foam quality and fails.

EXAMPLE 16

A capped non-silicon polyether surfactant is prepared by a process having the following steps:

1) 1013.2 grams of a butylene oxide ethylene oxide, propylene glycol initiated block polyether surfactant having a molecular weight of about 4,600 is charged into a 2 liter, 5 neck round bottom flask equipped with a vacuum distillation head, thermocouple, magnetic stirring bar, heating mantel and nitrogen inlet tube.
2) 60 grams acetic anhydride is charged to the round bottom flask.
3) Nitrogen is purged through the polyether and acetic anhydride for 30 minutes at ambient temperature.
4) The flask is heated to 85° C. for 30 minutes.
5) The material in the flask is refluxed at 100° C. for 2.5 hours.
6) The flask is at heated at 135° C. under partial vacuum for 15 minutes, nitrogen being introduced into the system to minimize bumping.
7) The temperature of the flask is increased to 150° C. and held under full vacuum until distillation is no longer visible.
8) The flask is held under full vacuum at 150° C. for an additional 15 minutes.
9) The product is then purged with nitrogen at 90 Torr (12 kPa) for 4 hours.
10) The product is cooled to ambient conditions.

The resultant material is a clear polyether having no measurable active hydrogen activity.

EXAMPLES 17, 18, AND COMPARATIVE 19

A polymer foam is prepared as follows:

1) A polyether surfactant is prepared substantially identically to Example 1 except that the polyether surfactant has a molecular weight of about 4,600; a weight percent BO of 86; a weight percent EO of 12; and ethylene oxide mixed with butylene oxide 80:20 is used to prepare the surfactant.
2) The polyether surfactant of step 1 is capped substantially identically to Example 16.
3) A polymer foam is prepared and tested substantially identically to Example 1 except that the capped surfactant of Step 2 above and the formulation listed in Table 8 is used and part of the surfactants and blowing agents are first admixed with polyisocyanate. Physical properties are recorded and listed in Table 9.

TABLE 8

| | CONCENTRATION IN WEIGHT PARTS | | |
|---|---|---|---|
| EXAMPLE NUMBER | 17 | 18 | Comp. 19* |
| Polyol[1] | 85 | 85 | 85 |
| Polyol[2] | 15 | 15 | 15 |
| Non-Si Surfactant | 2.47 | 1.23 | — |
| Conventional Silicone Surfactant[3] | — | — | 2.47 |
| Urethane Catalyst[4] | 0.25 | 0.25 | 0.25 |
| Isocyanurate Catalyst[5] | 4.0 | 4.0 | 4.0 |
| Water | 1.1 | 1.1 | 1.1 |
| Blowing Agent[6] | 28.9 | 28.9 | 28.9 |
| Polyisocyanate[7] | 220.1 | 220.1 | 220.1 |
| Non-Si Surfactant** | 0.53 | 0.26 | — |
| Conventional Silicone Surfactant[3]** | — | — | 0.53 |
| Blowing Agent[6]** | 11.0 | 11.0 | 11.0 |

NOT AN EXAMPLE OF THE PRESENT INVENTION
**Included in the A side
[1]STEPANPOL PS-2352 which is an aromatic polyester diol having a hydroxyl number of 235 (STEPANPOL PS-2352 is a trade designation of the Stepan Company)
[2]Mark-what is this polyol?
[3]Organosiloxane-polyether copolymer surfactant.
[4]POLYCAT 5 is a pentamethyl-diethylene triamine catalyst and is a trade designation of Air Products and Chemicals, Inc.
[5]HEXCEM 977 is a potassium salt of 2-ethylhexamoic acid in diethylene glycol and is a trade designation of OM Group, Inc.
[6]HCFC-141b is a 1,1-dichloro-1-flurorethane blowing agent.
[7]PMDI having a viscosity of 700 cps (0.7 NS/m$^3$) and a isocyanate equivalent weight of about 139. (Is this right?)

TABLE 9

| EXAMPLE NUMBER | 17 | 18 | Comp. 19* |
|---|---|---|---|
| REACTION PROFILE[1] | | | |
| Cream Time | 17 | 17 | 17 |
| Gel Time | 32 | 32 | 32 |
| Rise Time | 41 | 41 | 41 |
| Core Density[2] pcf/(kg/m$^3$) | 1.78/28.5 | 1.74/27.8 | 1.76/28.2 |
| K-factor[3] | 0.135 | 0.135 | 0.139 |
| COMPRESSIVE STRENGTH[4] psi/kPa | | | |
| Prarllel to Rise | 34.9/240.6 | 35.6/245.4 | 38.1/262.7 |
| Perpendicular to Rise | 13.5/93.1 | 12.9/88.9 | 13.1/90.3 |

*NOT AN EXAMPLE OF THE PRESENT INVENTION
[1]See note in Table 2.
[2]ASTM-D-1822-88
[3]ASTM-c-518-85
[4]ASTM-D-1621-73

What is claimed is:

1. An active hydrogen containing composition comprising:
   (A) a polyfunctional active hydrogen containing compound,
   (B) an optional blowing agent,
   (C) an optional catalyst, and
   (D) a non-silicone surfactant, wherein no silicone based surfactant is required in the composition; wherein the non-silicone based surfactant is present at a reaction mixture concentration of 0.25 to 20 parts per 100 parts of active hydrogen compounds, and wherein the non-silicone surfactant is an amine or hydroxy initiated polyether having from about 10 to about 90 weight percent oxyethylene units based on the combined weight of oxyethylene and oxyalkylene units and from about 10 to about 90 weight percent oxyalkylene units based on the combined weight of oxyethylene and oxyalkylene units, the oxyalkylene units having at least 4 carbons and the polyether being substantially free of oxypropylene units, and the non-silicone surfactant is represented by the formula:

$$I\text{-}(A\text{-}((E_x B_y P_z)\text{-}A'H_{Q'})_{Q'})_R$$

wherein I is the non-reactive portion of an initiator; A and A' are independently O, N, or NH; E is an oxyethylene group; B is an oxyalkylene group of 4 or more carbon atoms; P is an oxypropylene group; x, y are values such that the ratio of x:y is from 1:4 to 4:1; z is a value such that the total weight of oxypropylene units is less than 10 percent of the combined weight of oxyethylene units and oxyalkylene units; R is from 1 to 8 depending upon the functionality of the initiator; Q and Q' are independently 1 if A or A' is O or NH, and Q and Q' are independently 2 if A or A' is N; the total molecular weight of the compound is from 750 to 11,000; and E and B are in blocks.

2. The active hydrogen containing composition of claim 1 wherein the optional blowing agent is present.

3. The active hydrogen containing composition of claim 2 wherein the blowing agent is water.

4. The active hydrogen containing composition of claim 1 wherein the surfactant is a polyether having a weight ratio of oxyethylene units to other oxyalkylene units of from about 1:3 to about 3:1.

5. The active hydrogen containing composition of claim 4 wherein the surfactant is a polyether having a functionality of from about 1 to about 8.

6. The active hydrogen containing composition of claim 5 wherein the surfactant is a polyether having a functionality of from about 2 to about 4.

7. The active hydrogen containing composition of claim 6 wherein the surfactant is a polyether having a functionality of from about 2 to about 3.

8. The active hydrogen containing composition of claim 1 wherein the surfactant is a polyether having oxyethylene units and oxybutylene units.

9. The active hydrogen containing composition of claim 8 wherein the surfactant is prepared with an initiator including catalytic groups.

10. The active hydrogen containing composition of claim 1 wherein the active hydrogen containing compound is a base polyol.

11. The active hydrogen containing composition of claim 1 wherein the active hydrogen containing composition includes a silicone surfactant.

12. A composition prepared by a process comprising capping an amine or hydroxy initiated polyether with a material which is reactive with an amine or hydroxy group, the polyether having from about 10 to about 90 weight percent oxyethylene units based on the combined weight of oxyethylene and oxyalkylene units and from about 10 to about 90 weight percent oxyalkylene units based on the combined weight of oxyethylene and oxyalkylene units, the oxyalkylene units having at least 4 carbons, and the polyether being substantially free of oxypropylene units, the composition having the general formula:

$$I\text{-}(A((E_x B_y P_z)\text{-}A'\text{-}(C)_Q)_{Q'})_R$$

wherein I is the non-reactive portion of an initiator; A and A' are independently O, N, or NH; E is an oxyethylene group; B is an oxybutylene group; P is an oxypropylene group; x, y are values such that the ratio of x:y is from 1:4 to 4:1; z is a value such that the total weight of oxypropylene units is less than 10 percent of the combined weight of oxyethylene units and oxybutylene units; R is from 1 to 8 depending upon the functionality of the initiator; Q and Q' are independently 1 if A or A' is O or NH and Q and Q' are 2 if A or A' is N; the total molecular weight of the compound is from 750 to 11,000; C is the remainder of a capping compound; and E and B are in blocks.

13. A composition of matter having the general formula:

$$I\text{-}(A\text{-}((E_e B_y P_z)\text{-}A'\text{-}(C)_Q)_{Q'})_R$$

wherein I is the non-reactive portion of an initiator; A and A' are independently O, N, or NH; E is an oxyethylene group; B is an oxybutylene group; P is an oxypropylene group; x, y are values such that the ratio of x:y is from 1:4 to 4:1; z is a value such that the total weight of oxypropylene units is less than 10 percent of the combined weight of oxyethylene units and oxybutylene units; R is from 1 to 8 depending upon the functionality of the initiator; Q and Q' are independently 1 if A or A' is O or NH and Q and Q' are 2 if A or A' is N; the total molecular weight of the compound is from 750 to 11,000; C is the remainder of a capping compound; and E and B are in blocks.

* * * * *